(12) United States Patent
Pugalia et al.

(10) Patent No.: US 11,777,995 B2
(45) Date of Patent: *Oct. 3, 2023

(54) RESOURCE STATE VALIDATION OF ACCESS MANAGEMENT POLICIES

(71) Applicant: Amazon Technologies, Inc., Seattle, WA (US)

(72) Inventors: Ujjwal Rajkumar Pugalia, Santa Clara, CA (US); Sean McLaughlin, Seattle, WA (US); Neha Rungta, San Jose, CA (US); Andrew Jude Gacek, Maple Grove, MN (US); Matthias Schlaipfer, Vienna (AT); John Michael Renner, Wethersfield, CT (US); Jihong Chen, Little Neck, NY (US); Alex Li, Seattle, WA (US); Erin Westfall, Weehawken, NJ (US); Daniel George Peebles, Richland, WA (US); Himanshu Gupta, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,318

(22) Filed: Jan. 3, 2022

(65) Prior Publication Data

US 2022/0201043 A1 Jun. 23, 2022

Related U.S. Application Data

(63) Continuation of application No. 17/114,286, filed on Dec. 7, 2020, now Pat. No. 11,218,511.

(51) Int. Cl.
*G06F 15/16* (2006.01)
*H04L 9/40* (2022.01)

(52) U.S. Cl.
CPC .............. *H04L 63/20* (2013.01); *H04L 63/08* (2013.01); *H04L 63/102* (2013.01); *H04L 63/105* (2013.01)

(58) Field of Classification Search
CPC ....... H04L 63/20; H04L 63/08; H04L 63/102; H04L 63/105

(Continued)

(56) References Cited

U.S. PATENT DOCUMENTS 7,254,628 B2  8/2007  Koops et al.
7,735,140 B2  6/2010  Datla et al.

(Continued)

OTHER PUBLICATIONS

Parliament, published by Duo Labs, downloaded Dec. 7, 2020, available at https://github.com/duo-labs/parliament/blob/main/README.md, pp. 1-9.

*Primary Examiner* — Moustafa M Meky
(74) *Attorney, Agent, or Firm* — S. Scott Foster; Kowert, Hood, Munyon, Rankin & Goetzel, P.C.

(57) ABSTRACT

Resource state validation may be performed for access management policies by an identity and access management system. An access management policy associated with an account for network-based services may be received and validated according to resource state obtained for resources associated with the account. A correction for a portion of the access management policy may be identified according to the validation and provided via an interface for the identity and access management system.

20 Claims, 9 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 8,209,417 | B2* | 6/2012 | Kakarla | G06F 9/5077 |
| | | | | 714/13 |
| 8,843,643 | B2* | 9/2014 | Larson | H04L 61/30 |
| | | | | 709/227 |
| 8,904,516 | B2* | 12/2014 | Larson | G06F 16/951 |
| | | | | 713/153 |
| 9,037,713 | B2* | 5/2015 | Larson | H04L 63/1416 |
| | | | | 709/227 |
| 9,077,694 | B2* | 7/2015 | Larson | H04L 61/5092 |
| 9,288,235 | B1* | 3/2016 | Hou | H04W 4/029 |
| 9,374,346 | B2* | 6/2016 | Larson | H04L 63/0407 |
| 9,602,545 | B2* | 3/2017 | Pitre | H04L 63/102 |
| 9,967,240 | B2* | 5/2018 | Larson | H04L 63/0435 |
| 10,025,810 | B2 | 7/2018 | Burk et al. | |
| 10,038,722 | B2 | 7/2018 | Ramachandran et al. | |
| 10,198,467 | B2 | 2/2019 | Burk et al. | |
| 10,263,847 | B2 | 4/2019 | Burk et al. | |
| 11,218,511 | B1* | 1/2022 | Pugalia | G06F 21/6218 |
| 2004/0225727 | A1 | 11/2004 | Koops et al. | |
| 2005/0256961 | A1* | 11/2005 | Alon | H04L 67/1097 |
| | | | | 709/229 |
| 2005/0273851 | A1 | 12/2005 | Raju Datla et al. | |
| 2008/0222642 | A1* | 9/2008 | Kakarla | G06F 9/5077 |
| | | | | 718/104 |
| 2015/0200943 | A1* | 7/2015 | Pitre | G06F 21/604 |
| | | | | 726/1 |
| 2016/0080421 | A1* | 3/2016 | Hou | H04L 41/0806 |
| | | | | 726/1 |
| 2017/0070504 | A1 | 3/2017 | Ramachandran et al. | |
| 2018/0075231 | A1 | 3/2018 | Subramanian et al. | |
| 2018/0260300 | A1 | 9/2018 | Clarke et al. | |
| 2018/0352002 | A1 | 12/2018 | Ramachandran et al. | |
| 2019/0318060 | A1* | 10/2019 | Brenner | H04N 21/8358 |
| 2020/0327546 | A1* | 10/2020 | Pennington | G06Q 20/223 |

* cited by examiner

RESOURCE STATE VALIDATION OF ACCESS MANAGEMENT POLICIES

This application is a continuation of U.S. patent application Ser. No. 17/114,286, filed Dec. 7, 2020, which is hereby incorporated by reference herein in its entirety.

BACKGROUND

A cloud provider, or other provider network, may implement multiple network-based services. These services may provide different functionality, such as computational resources, storage resources, data transmission, among various others. Access controls to coordinate the identity and privileges of different users to obtain, use or otherwise manage resources from the network-based services may be implemented to secure the use of managed resources for authorized users.

Figure 1:
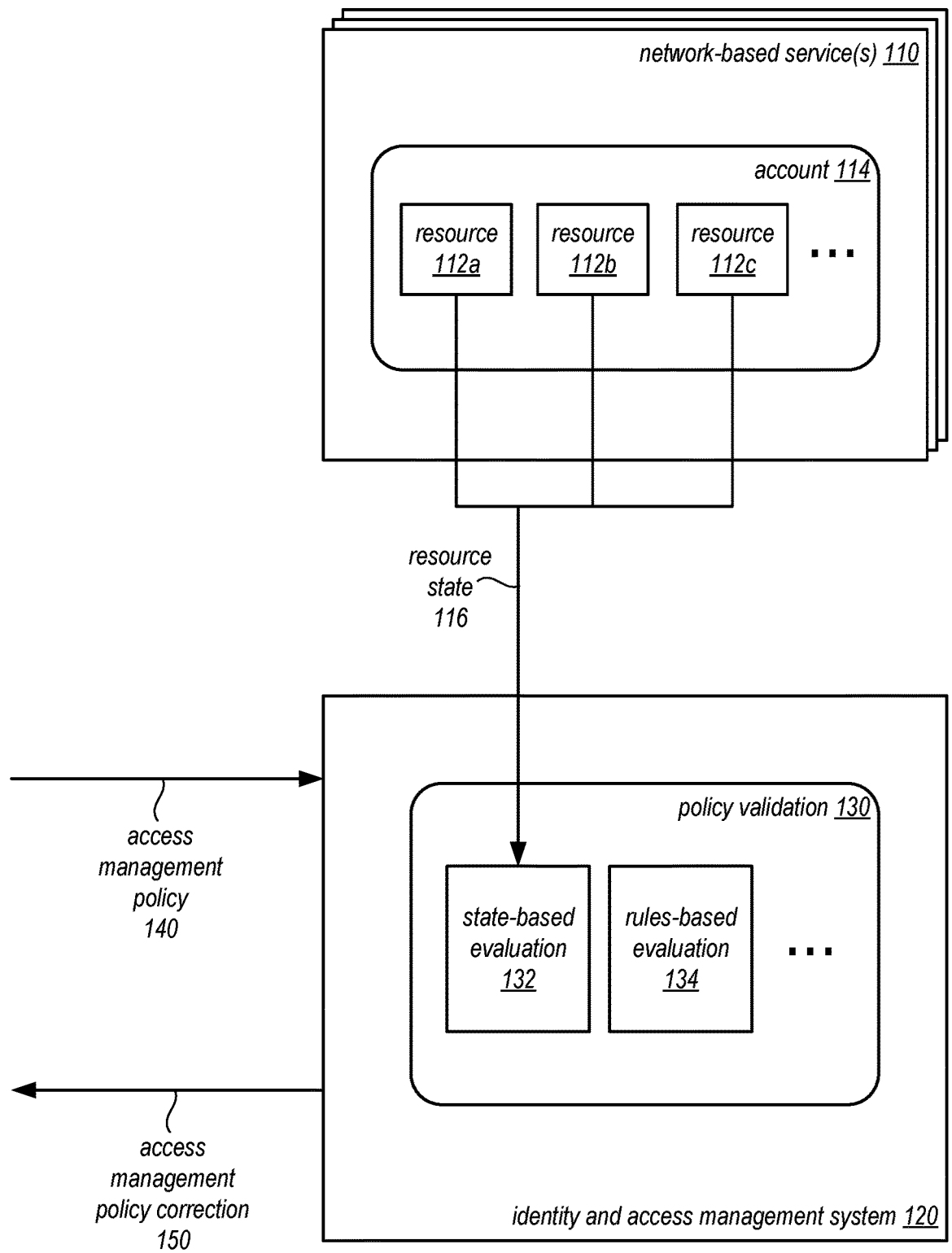
FIG. 1 illustrates a logical block diagram of resource state validation of access management policies, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for resource state validation of access management policies are described herein. Identity and access management systems may support various features to control access to resources hosted in other network-based services. Access management policies, for example, may specify various actions and effects with respect to resources in different network-based services in order to provide fine-grained access control, in various embodiments. Access management policies may be specified in various ways, in human-readable formats, such as JavaScript Object Notation or other system-specific policy languages (e.g., as supported by identity and access management service 210 in FIG. 2). As access to the number of resources and services managed through the use of access management policies increases, the complexity and potential for errors increase. Instead of implementing policy validation techniques that rely upon statically defined mappings to recognize and correct errors in access management policies, resource state validation of access management policies can customize the validation and correction of access management policies for specific policies, providing context-sensitive policy analysis. Moreover, changes to the state of resources can be incorporated into the validation of policies, so that policy validation of access management policies can dynamically adapt changes over time (and adapt different for different policies, as such policies may be associated with different accounts).

FIG. 1 illustrates a logical block diagram of resource state validation of access management policies, according to some embodiments. Identity and access management system 120 may implement policy validation 130 in order to validate policies for errors and/or other scenarios for which corrections can be suggested or made, in some embodiments. As noted above, while policy validation 130 may implement rules-based validation 134 (which may detect and/or correct errors using static error definitions and corrections), policy validation 130 may also implement state-based validation 132 which may allow for the validation of policies adjust dynamically to changes in the state of resources affected by the policy.

For example, as illustrated in FIG. 1, account 114 may span one (or more) network-based service(s) 110, and may include one or more resources, such as resource 112a, 112b, and 112c. Resource state 116 may be obtained for account resources 112 in order to inform the validation of access management policy 140. As discussed below with regard to FIGS. 5 and 6, various techniques for obtaining resource state 116 may be obtained. By providing resource state 116, state-based validation 132 can identify and provide access management policy corrections 150 that cannot be otherwise identified by static error detection and corrections as differences between resource states of different accounts cannot be easily statically defined.

The previous description of an identity and access management system in FIG. 1 is a logical illustration and thus is not to be construed as limiting as to the architecture for implementing an identity and access management system.

This specification begins with a general description of a provider network that implements an identity and access management service for different services across provider network regions. Then various examples of the identity and access management service including different components/modules, or arrangements of components/module that may be employed as part of implementing the identity and access management service are discussed. A number of different methods and techniques to implement quorum-based access control management are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
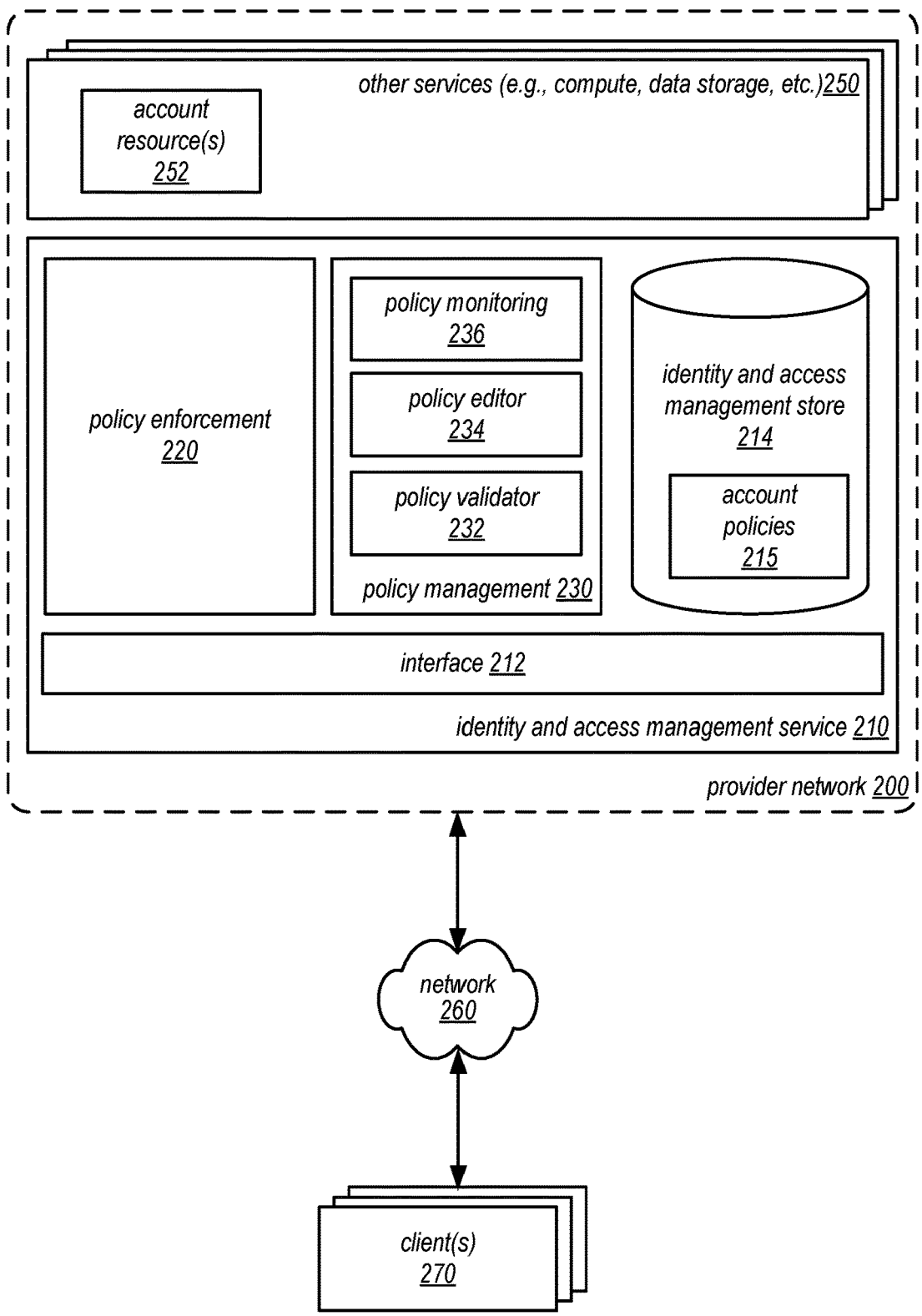
FIG. 2 is a logical block diagram illustrating a provider network implementing an identity and access control management service that implements resource state validation of access management policies, according to some embodiments.

FIG. 2 is a logical block diagram illustrating a provider network implementing an identity and access control management service that implements resource state validation of access management policies, according to some embodiments. In various embodiments, a provider network 200 may be a private or closed system or may be set up by an entity such as a company or a public sector organization to provide one or more services (such as various types of cloud-based storage, processing, or other computing resources) accessible via the Internet and/or other networks to clients 270. The provider network may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, such as provider network regions, where a region may be a separate geographical area in which the provider network clusters or manages data centers, in some embodiments. Each region 200 may include two or more availability zones (sometimes referred to as fault tolerant zones) connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Clients 270 can connect to availability zones of the provider network via a publicly accessible network (e.g., the Internet, a cellular communication network). Regions may be connected to a global network which includes private networking infrastructure (e.g., fiber connections controlled by the cloud provider) connecting each region to at least one other region. The provider network may deliver content from points of presence outside of, but networked with, these regions 200 by way of edge locations and regional edge cache servers. This compartmentalization and geographic distribution of computing hardware enables the provider network to provide low-latency resource access to customers on a global scale with a high degree of fault tolerance and stability.

In some embodiments, a provider network may implement various computing resources or services across one or more regions, such as identity and management service 210 and other services 250, which may include a virtual compute service, data processing service(s) (e.g., map reduce, data flow, and/or other large scale data processing techniques), data storage services (e.g., object storage services, block-based storage services, database services, or data warehouse storage services) and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network 200, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system 1000 illustrated in FIG. 9 and described below. In various embodiments, the functionality of a given system or service component (e.g., a component of identity and access management services 210 or other services 250) may be implemented by a particular node or may be distributed across several nodes. In some embodiments, a given node may implement the functionality of more than one service system component (e.g., more than one data store component).

Identity and access management service 210 may implement resource state validation of access management policies and other validation techniques, as discussed above with regard to FIG. 1 and below with regard to FIGS. 3-8. Identity and access management service 210 may provide operators of other services 250 and auditing/monitoring service 240, with the ability to enforce access controls for various types of users and various roles of users associated with an account according to the identity determined for and shared by identity and access management service 210. For example, identity and access management service 210 can provide fine-grained access controls to different service resources, support different authentication techniques or protocols, such as multi-factor authentication (MFA), support analysis or tools for specifying access controls, and integration features for external or alternative identity and access control mechanisms, in some embodiments. User controls may be implemented to determine what, wherein, and when users can access resources and how the resources may be used by users, including federated users to provide management for groups of users and/or roles which may support features like single sign-on (SSO), in some embodiments.

Identity and access management service 210 may implement interface 212. Interface 212 may be a programmatic interface (e.g., supporting one or more APIs), graphical (e.g., providing a web-based console or other graphical control), and/or command line interfaces, in various embodiments, to allow for the specification and management of various identity and access management service 210 features, including creating, editing, and validating access management policies s as discussed below with regard to FIGS. 3 and 4 for performing access operations.

Identity and access management service 210 may implement policy enforcement 220, in various embodiments. For example, various access control management policies may be specified and enforced for different account resource(s) 252 in other services 250. Policy enforcement 220 may serve as an authorization and access control for various requests, operations, or other actions taken with respect to account resources by various users, accounts, roles, and/or other identities by enforcing access management policies according to the various features specified in the access management policies. For example, policy enforcement 220 may interpret these policies, determine whether and what resources and actions are within the scope of a policy and provide access control information to other services in order for other services to allow or deny requests directed to account resource(s) 252. Identity and access management store 214 may store the created and enforced account policies 215, in various embodiments.

In various embodiments, policy management 230 may implement policy editor 234. As discussed in detail below with regard to FIGS. 3 and 4, various interfaces and/or interactions may be used to allow users to create, edit, and/or remove access management policies. In this way, users can take advantage of the flexible and customizable features of access control policies to tailor access control management for specific scenarios in an account. As noted below, policy editor 234 may, in some embodiments, invoke policy validator 232 (which may be sometimes referred to as a policy linter), in order to provide feedback that can be made through policy editor 234.

Figure 5:
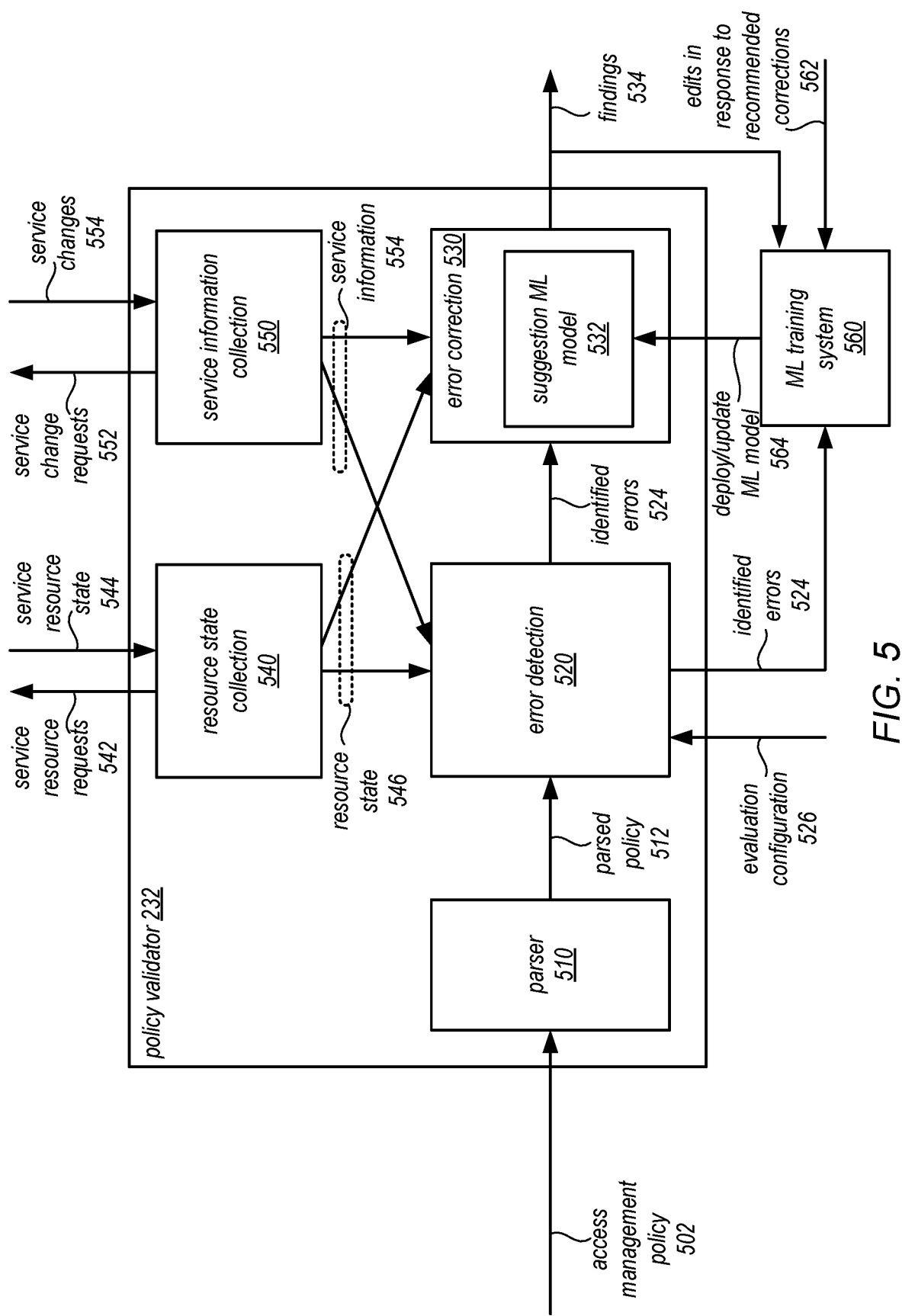
FIG. 5 is a logical block diagram of a policy validator that implements resource state validation of access management policies, according to some embodiments.

Because errors in policies can lead to unintended consequences when enforced (e.g., being overly permissive or restrictive upon operations), policy management 230 may implement policy validator 232, in some embodiments. In this way, policy validator 232 can provide a user with feedback to correct, modify, or optimize that would otherwise lead to undesirable outcomes when a given access management policy was enforced. FIG. 5 provides a detailed discussion of policy validation including the use of resource state information to provide context-sensitive and dynamic validation of policies that adapts and optimizes policy validation different across different accounts.

In some embodiments, policy management 230 may implement policy monitoring 236. As discussed in detail below with regard to FIG. 7, policy monitoring 236 may further adapt the performance of policy management to handle changes in other services 250 features (e.g., new or different actions, modifications to parameters or output of actions, etc.) and/or changes to resources (e.g., the addition of new resources). As noted below, policy monitoring may provide indications of detected changes that effect existing policies so that policy editor 234 could be used (if necessary) to edit an existing policy to account for a detected change.

Generally speaking, clients 270 may encompass any type of client configurable to submit network-based requests to provider network regions 200 via network 260, including requests for other services 250 (e.g., a request to create a database, start a computation job, setup a data stream, etc.). In some embodiments, operators of a service (e.g., service 250) may be a client 270 that performs requests to specify quorum controls and/or access control operations, in some embodiments. For example, a given client 270 may include a suitable version of a web browser, or may include a plug-in module or other type of code module configured to access a management console to specify quorum controls and/or access control operations. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application configured to interact directly with provider network region 200. In some embodiments, client 270 may be configured to generate network-based services requests according to a Representational State Transfer (REST)-style network-based services architecture, a document- or message-based network-based services architecture, or another suitable network-based services architecture. Although clients 270 are illustrated as external to provider network 200, in some embodiments clients of different services, like other services 250, can be implemented within provider network region 200 (e.g., implemented on a resource of another service 250, such as virtual compute instance).

Clients 270 may convey network-based services requests to and receive responses from provider network regions 200 via network 260. In various embodiments, network 260 may encompass any suitable combination of networking hardware and protocols necessary to establish network-based-based communications between clients 270 and provider network regions 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 270 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network region 200. It is noted that in some embodiments, clients may communicate with provider network region 200 using a private network rather than the public Internet.

Figure 3:
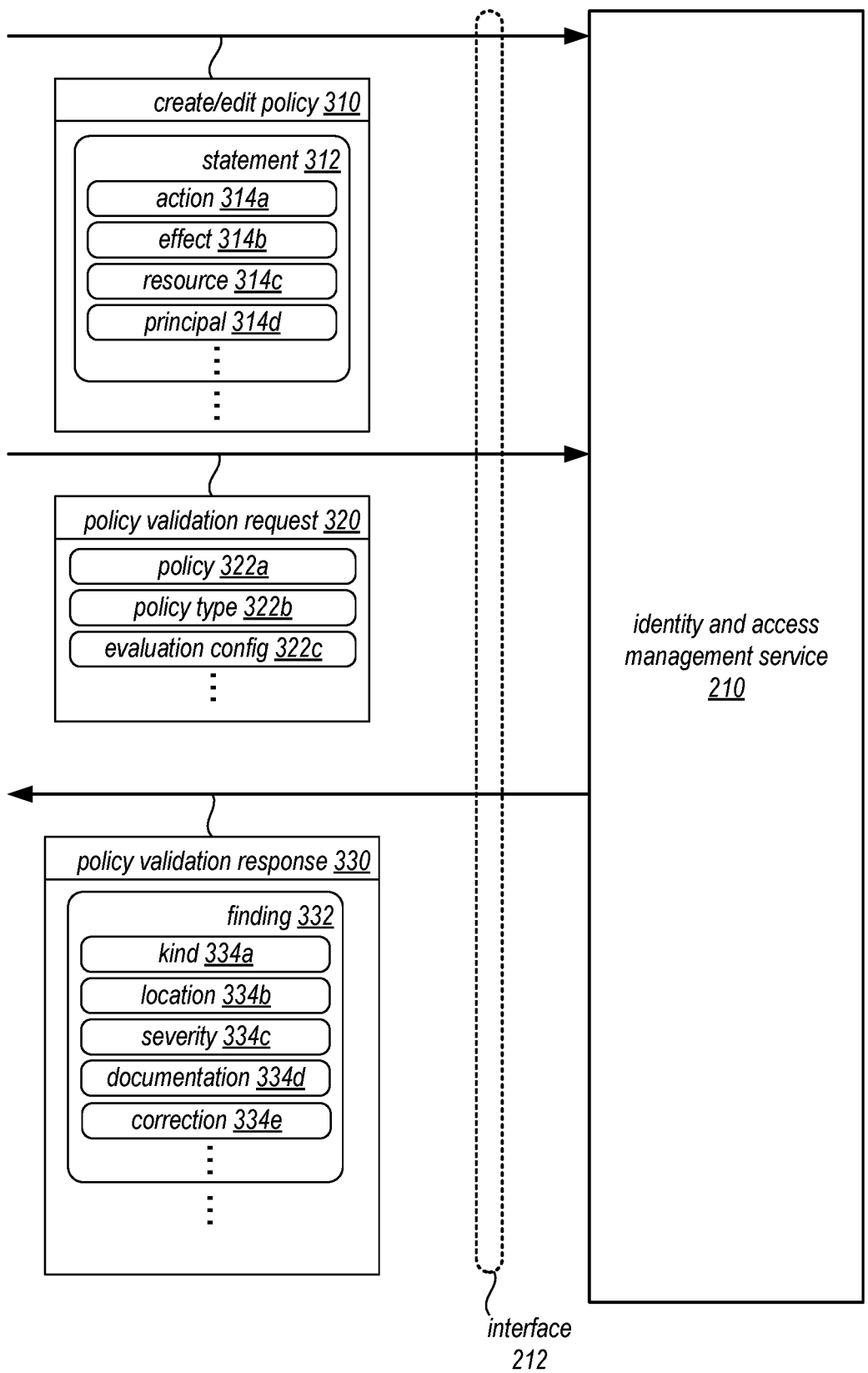
FIG. 3 illustrates example interactions to create, edit, and validate an access control policy at an access and identity management service, according to some embodiments.

As noted earlier, identity and access management service 210 may implement an interface to manage access management policies enforced by identity and access management service 210. FIG. 3 illustrates example interactions to create, edit, and validate an access control policy at an access and identity management service, according to some embodiments. Various requests to create and/or edit a policy, as indicated 310 may be supported via interface 212. For example, policies may include various features included in one or more statements 312, such as action 314a (e.g., service actions allowed or denied by a policy), effect 314b (e.g., allows or denies actions), resource 314c (e.g., resource identifier, name or other information which the policy is attached), principal 314d (e.g., an account, user, role, or other mechanism for making access decisions to allow or deny, among others (e.g., policy language version, conditions, identifiers for statements, etc.). These features of a policy can be specified and then validated according to the various techniques discussed below.

As indicated at 320, a policy validation request may be supported via interface 212 and handled by policy validator 232 as discussed in detail below. For example, a policy validation request may identify the policy 322a (e.g., by identifier or include the policy, such as the policy statements, to validate), policy type 322b, (e.g., identity-based policy, resource-based policy, permission boundary policy, service control policy, access control list, session policy, etc.), and/or various validation configuration information 322c (e.g., policy language version, policy error suppression configuration, which may specify various features of a finding that should be suppressed, such as the finding features discussed below). For example, a suppression configuration may allow a user to tailor the findings of the policy validator to ignore known or non-useful results. For instance, a suppression configuration can suppress findings that match all of the specified suppression criteria (e.g., kind, label, service, and/or severity) included in the suppression configuration.

As indicated at 330, a response to a policy validation may include various features to provide, among other information, a correction. For example, response 330 may include one or more findings 332, that pertain to portions of the policy and include information such as a kind 334a (e.g., an identifier of the rule or other type of error found, including resource state-based errors), location 334b (e.g., location in policy of error), severity 334c (e.g., "suggestion," "warning," "error"), documentation 334d (e.g., location of documentation that discusses the error), correction 334e (e.g., suggested change, such as suggested correction based on resource state, ML model inference, etc.), among others.

Figure 4:
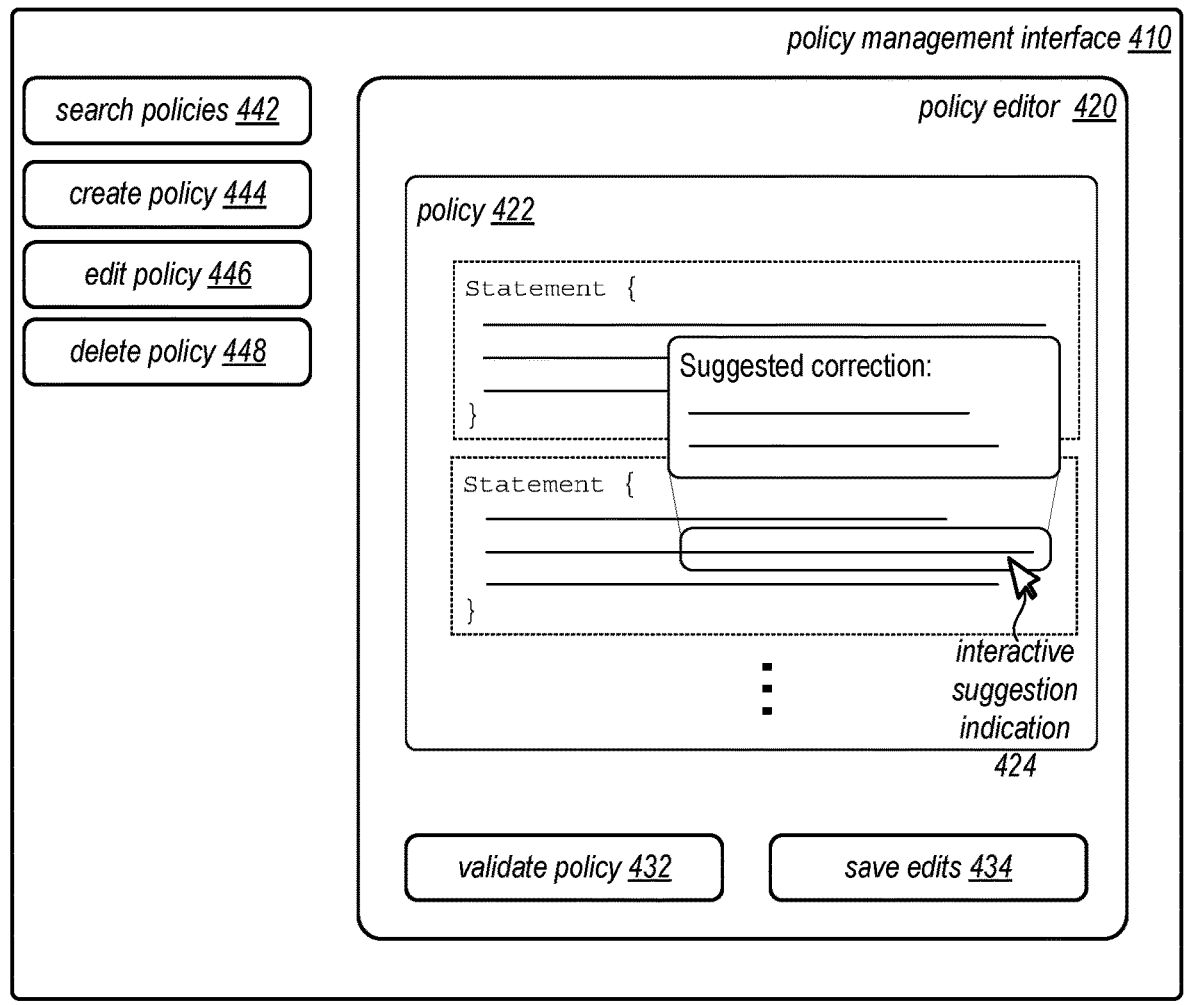
FIG. 4 illustrates an example user interface that provides a suggested correction to an access control policy, according to some embodiments.

FIG. 4 illustrates an example user interface that provides a suggested correction to an access control policy, according to some embodiments. Policy management interface 410 may be supported or implemented as part of interface 212 for identity and access management service 210, in some embodiments. Policy management interface 410 may provide various features to create, locate, edit, or remove policies. In some embodiments (not illustrated) policy management interface 410 may support visual (as opposed to a text-based) editor, that utilizes various fields, guided questions and/or user interface elements, presented options, symbols, or other features to generate a policy. Although FIG. 4 illustrates a text-based editor, similar features for indicating corrections, making corrections, and other interactions could be implemented using a visual editor.

Policy management interface 410 may implement various user interface elements to search for policies, as indicated at 442, in some embodiments. For example drop-down lists, search bars, or other search tools can be used (e.g., including tabular displays of existing policies) can be provided to locate a policy to edit. Policy management interface 410 may implement various user interface elements to create a policy, as indicated at 444, in some embodiments. For example, a visual editor or other guided process can be triggered or a text-based editor to manually enter the policy may be provided. As indicated at 446, in various embodiments policy management interface 410 may implement various user interface elements to delete a policy.

Policy editor 420 may be implemented in order to provide a space to view a policy, in some embodiments. For example, policy 422 may be displayed in a text-based editing format, allowing a user to use a cursor, keyboard, and/or other text entry tools create and edit a policy. As discussed above with regard to FIG. 3, a policy may, in some embodiments, include various statements, as illustrated in FIG. 4. Policy editor 420 may implement one or more user interface elements to submit a request to validate the policy, as indicated at 432, which may include various features similar to those discussed above with regard to FIG. 3. Various validation results may be provided, including various findings coded using different symbols, colors, highlighting or other graphical features. As indicated at 424, an interactive indication of a suggestion to correct a portion of policy 422 may be triggered by the location of a pointer or other cursor over a highlighted portion, which may provide a suggested correction to the portion of the policy. Edits made in response to the validation (or other edits not prompted by an validation) may be saved for the policy using one or more interface elements 434, in some embodiments.

As discussed above with regard to FIGS. 1 and 2, policy validation may be performed that implements resource state validation of access management policies. FIG. 5 is a logical block diagram of a policy validator that implements resource state validation of access management policies, according to some embodiments. For example, policy validator 232 may implement parser 510. Parser 510 may receive or obtain an access management policy to be validated, as indicated at 502 (or multiple policies as discussed below). Parser 510 may analyze the policy to separate various features of the policy using various delimiters into a symbol tree or other parsed representation 512 that can then be validated for errors at error detection 520, in some embodiments.

Policy validator 232 may dynamically update the information used to detect errors and correct errors (e.g., automatically or via suggestions). For example, resource state collection 540 may be implemented, in various embodiments. Resource state collection 540 may send service resource requests 542 to collect various resource state information to different services (e.g., other services 250), including describe requests, pings, status requests, manifest access, get metadata requests. In some embodiments, provider network 200 may implement a centralized repository for service state information, which may be periodically updated and requested, as indicated at 542. Service resource state 544 may be returned in various embodiments. Resource state may include various information about resources such as resource names, resource attributes, resource configuration, and/or other resource information may be obtained. In some embodiments, resource state information to collect may be determined from an initial validation of the policy based on parsed policy 512 (not illustrated). As indicated at 546, resource state may be provided to error detection 520 and error correction 530 for application as part of policy validator 232. In some embodiments, initially returned data (e.g., a list or description of resources) may be used to determine one or more subsequent service resource requests 542, which may return further resource information to inform policy validation.

Policy validator 232 may implement service information collection 552, in some embodiments. Service changes 554 may either be manually input (e.g., from service operators) and/or queried, requested, scrapped, or otherwise proactively obtained 552 by service information collection 550, in some embodiments. For example, network-based services, like other services 250) may store service specifications and/or descriptions that provide an ingestible or processable version of service features (e.g., APIs, configurations, service level agreements, etc.). Service changes 554 may be determined from these specifications and/or descriptions. Service information collection 550 may provide service information 554 to error detection 520 and error correction 530, in some embodiments.

Policy validator 232 may implement error detection 520 in various embodiments to detect or otherwise identify errors 524 in access management policies. For example, error detection 520 may implement a rules-based error detection engine which may examine a parsed policy for various rule-based errors, resource state-based errors, service errors, ML model based error detection (not illustrated) among other error detection techniques. For example rules-based validations may be implemented to check for various errors. Some of these errors may include: (a) invalid operators (e.g., "*") with respect to some features of a policy (e.g., "principals) may be identified, according to a rule that validates the placement of "*" in a policy; (b) invalid actions which do not map to existing APIs or other service features; (c) incorrect action combinations with other policy elements (e.g., "allow" with "NotPrincipal"); (d) type-based errors (e.g., a string is placed where an number format is expected or improper location of NULL); (e) invalid variables (e.g., a policy includes a variable that is expected to be provided by a service); (f) invalid providers; (g) missing version or other information characterizing a policy; (g) missing resources (e.g., a service is not supported in a location specified in the policy, such as a region); and/or (h) improperly formatted identifiers.

Resource state 546 validations may also be performed to detect errors at error detection 520, in some embodiments. For example, error detection 520 may use resource state information to identify improper configurations, such as networking configurations that are specified in policies. In some embodiments, resource state-based validations may include identifying non-existent resources specified in a policy. Similarly, service information 554 may be used to detect some of the errors discussed above.

In some embodiments, validation configuration 526 may be specified as part of an validation request, in some embodiments. For example, as discussed above various error suppression settings may be enforced to ignore or identify suppressed errors that are detected. In some embodiments, various rule set versions can be specified as part of validation configuration 526 (e.g., allowing various versions of the rule sets used to detect and/or correct errors).

Identified errors 524 may be provided to error correction state 530, in some embodiments. Rules, mappings, and/or other features, such as suggestion ML model 532, may be used to determine the respective error corrections. For example, erroneous resource names can be compared with a list of account resources, where a closest match is suggested to correct the error. Similarly, in another example, IP address restrictions could be analyzed to for breadth (e.g., reference a/22 CIDR block, when the account only has access to a/28 block) or empty (e.g., the policy specifies access that an account does not have to receive traffic from a virtual private cloud because of an erroneous CIDR in the policy).

As discussed below with regard to FIG. 8, suggestion machine learning (ML) model 532 can also be applied to determine suggested corrections. For instance, ML training system 560 can be implemented to deploy or update ML model 532 based the the information collected from numerous policies and edits performed, such as by using edits in response to recommended corrections 562 (or identified errors 524), train suggestion ML model 532. In various embodiments, data privacy rules and/or other safeguards may be implemented in order to ensure that data collection is limited to scenarios in which policy consent is actively given. For example, prior to saving edits or changes, a request to opt-in to data collection to improve validation suggestions may be provided, which may allow a user to affirm or deny consent to the collection of edits for the purposes of training ML model 532. In some embodiments, configuration information for an account may also provide for controls for a user to later opt out or opt back in, if desired. Additionally, privacy guarantees for those users that do give consent may still be enforced. For example, anonymization of data may be performed to remove any user-specific or resource specific information (e.g., identifiers, accounts, configurations or other information outside the scope of policy edits given in response to corrections provided by policy validator 232.

Although FIGS. 2-5 have been described and illustrated in the context of an identity and access management service, the various techniques and components illustrated and described in FIGS. 2-5 may be easily applied to other access control systems in different embodiments for one or multiple different systems or services, which may be public or private. As such, FIGS. 2-5 are not intended to be limiting as to other embodiments of a system that may implement resource state validation of access management policies.

Various different systems and devices may implement the various methods and techniques described below, either singly or working together. For example, an identity and access management service such as described above with regard to FIGS. 2-4 may be configured to implement the various methods. Therefore, the above examples and or any other systems or devices referenced as performing the illustrated method, are not intended to be limiting as to other different components, modules, systems, or configurations of systems and devices.

Figure 6:
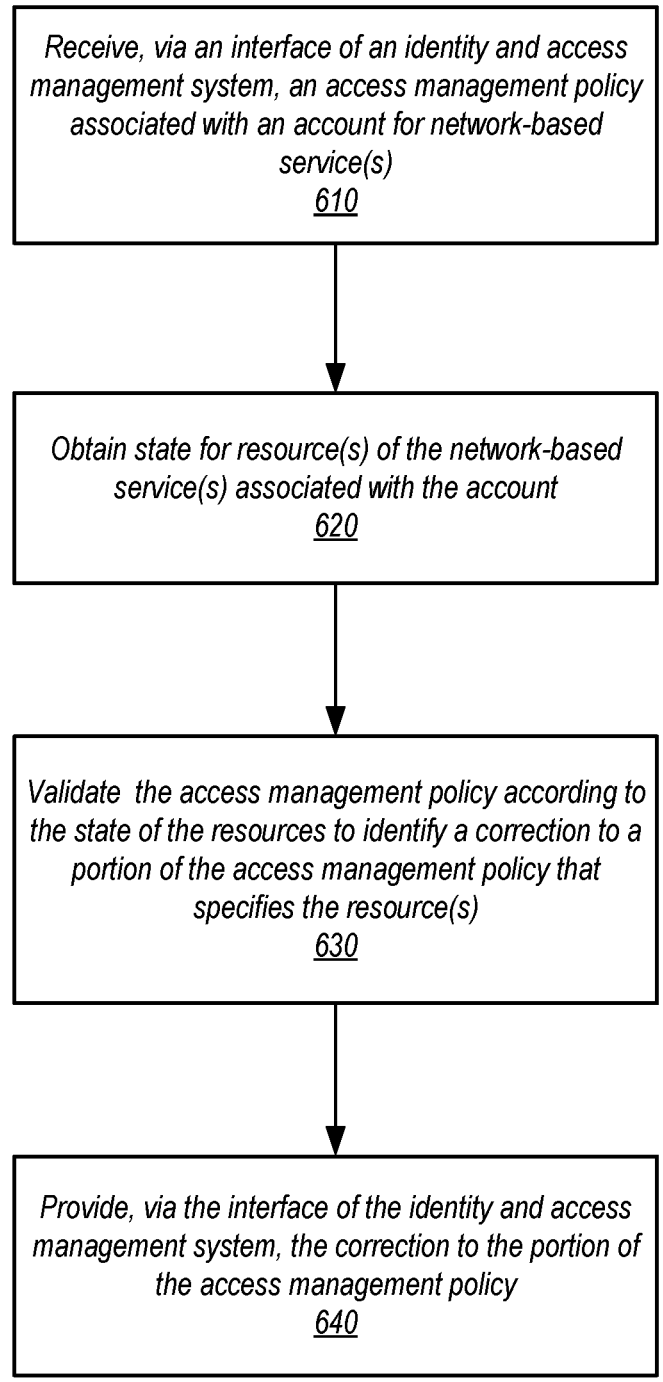
FIG. 6 is a high-level flowchart illustrating various methods and techniques to implement resource state validation of access management policies, according to some embodiments.

FIG. 6 is a high-level flowchart illustrating various methods and techniques to implement resource state validation of access management policies, according to some embodiments. In various embodiments, an access management policy associated with an account for network-based service(s) may be received via an interface of an identity and access management system, as indicated at 610. For example, as discussed above with regard to FIGS. 3 and 4, various graphical, programmatic (e.g., API), and/or command line interfaces may be used to provide an access management policy. In some embodiments, the access management policy may be received as part of a request to validate the access management policy, while in other embodiments, the access management policy may be received separately. Access management policies, as discussed above with regard to FIG. 1, may be specified in various formats (e.g., human-readable formats, such as JSON) domain specific or system-specific policy languages (e.g., as supported by identity and access management service). Access management policies may specify actions with respect to resources and/or users, as well as various other features, as discussed above, in some embodiments.

As indicated at 620, state for resource(s) associated of the network-based resources associated with the account may be obtained, in some embodiments. For example, as discussed above, resource state information may be periodically collected by polling various manifests, description APIs, and/or various other collections of resource state information maintained for each network-based service according to account, in some embodiments. Different types of state, such as resource names, resource attributes, resource configuration, and/or other resource information may be obtained (e.g., information describing the work or actions performed by a resource, such as the last time a resource was updated or the last time a resource handled a service request). a As indicated at 630, the access management policy may be validated according to the state of the resources to identify a correction to a portion of the access management policy that specifies the resource(s), in some embodiments. For example, a rules-based engine or other error identification technique may be applied to validate various features of the access management policy (e.g., proper actions, existing resources, missing parameters, etc.), as discussed above with regard to FIG. 5. If an error is detected, then the state information may be used to determine the correction. For example, for a missing parameter, a resource name may be identified if such a resource can be identified based on the context of the other existing portions of the policy. Similarly, an erroneous resource name may be compared with existing resource names to identify a "correct" replacement resource name to suggest. Resource configurations or attributes, including networking information or other aspects for managing or access resources, may be used to determine if, for instance, an access operation exceeds the configuration of a resource to which the access operation is directed or applied, in some embodiments.

As indicated at 640, the correction may be provided via the interface of the identity and access management system, in some embodiments. In some embodiments, the correction may be a suggestion that provides instructions for a user to perform the suggested correction. For example, similar to the discussion above with regard to FIGS. 3 and 4, text, programmatic and/or graphical display of suggested corrections may be made. Notifications or other communication systems may be utilized, in some embodiments. In some embodiments, the correction may be one of many corrections, some of which may be automatically applied (e.g., entered into a text policy document edit), whereas some corrections may request consent or permission to be performed. In some embodiments, the other corrections may be generated according to rules-based engine alone (e.g., not using resource state information, such as a correction to the syntax of various commands or parameters to ensure proper format, identify missing delimiters, etc.).

Although techniques discussed above are discussed in the context of validating a single access management policy, multiple, associated access management policies could be considered together, including whether or not the validity of one policy affects the correctness of another policy, in some embodiments. For example, when validating one policy, if a dependency is detected on another policy, then a second policy evaluation of the other policy may be started in order to determine whether the other policy will affect the correctness of the policy being validated, in some embodiments. Validation requests may specify such dependency checks for a policy, which may cause the policy validator to search out and identify inter-policy dependencies. In some embodiments, validation requests may specify a batch or group of policies to be considered together.

Resources and services that host the resources may change over time. For example, additional resources may be created, modified, or removed that are associated with an account, in some embodiments. In some embodiments, services may support different features or actions, such as adding (or removing) operations, combining operations, among other changes. Accounting for these changes may be implemented in order reconsider the introduction errors in an access management policy that were not identified in an initial run of policy validation but would be subsequently identified if the policy were to be re-validated based on the changes. For example, policies could be designated to accept "read-only" or "full-control" actions. If a non-read-only action were to be added to an existing "read-only" policy, an indication could be provided to a policy owner (or to a user attempting to make the edit). In another example, if a service adds a new action or resource type which is not covered by the "full-control" policy, a warning could be raised. In some embodiments, resource state could be monitored so that if a feature in a policy were to state "all-my-widgets", the feature would be indicated if a new widget was added (allowing the policy to be updated, if necessary, to modify handling for that new widget.

Figure 7:
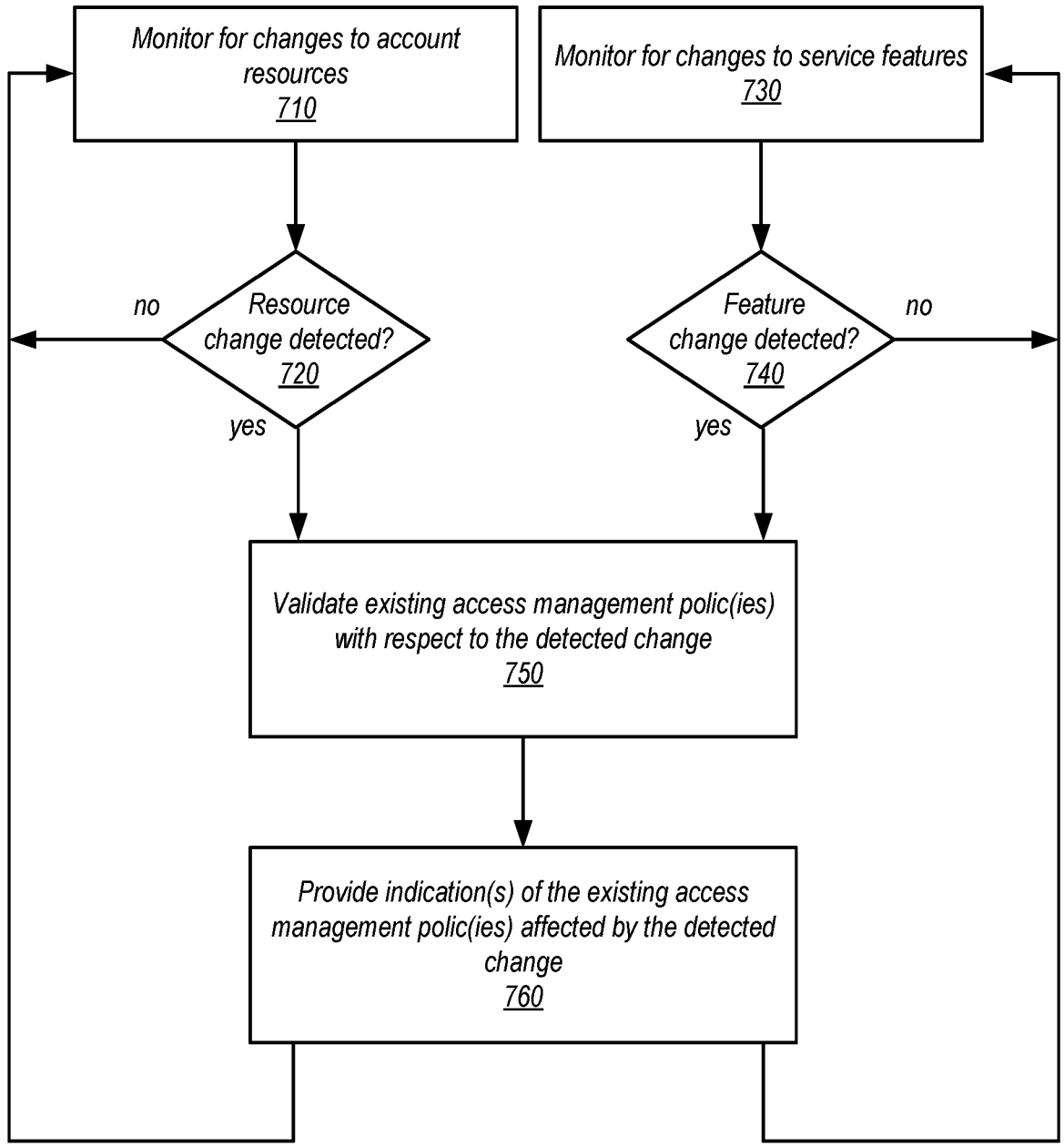
FIG. 7 is a high-level flowchart illustrating various methods and techniques to implement monitoring the effects of changes to existing access management policies, according to some embodiments.

FIG. 7 is a high-level flowchart illustrating various methods and techniques to implement monitoring the effects of changes to existing access management policies, according to some embodiments. In various embodiments, monitoring may be performed for changes to account resources, as indicated at 710. For example, an audit log, update stream, or other state information that describes resource updates can be monitored to search for resources specified in a policy (or all resources for an account). If a resource change is detected, as indicated by the positive exit from 720, then a validation to handle the change with respect to existing access management policies may be performed, as indicated at 750. For example, the resource may be compared with existing access management policies to see if the resource is covered by a policy statement. It may be the case that a resource change does not affect the validity or scope of the policy (e.g., changing a resource location may not affect a policy statement covering that resource that is not applied based on location). For scenarios where the resource does affect the policy (e.g., in terms of extending or modifying the scope of the policy or causing the policy to fail), then as indicated at 760, indication(s) of the existing access management polic(ies) affected by the detected change may be provided. For example, the indication may be a notification or status change sent via a communication system (e.g., notification system) or posted/displayed via an interface (e.g., a policy warning or other symbol indicating that the policy is affected by a detected change to the resource of the account a may need to be re-validated by a user, such as via a policy editor).

As noted earlier, services may also change. As indicated at 730, changes to service features may be monitored for, in some embodiments. For example, service descriptions may be periodically scraped, rules engines or other configuration information accessed, and/or any other service information indicative of service changes that implicate policies may be examined (e.g., by comparison with a prior version). If a service change is detected, as indicated by the positive exit from 740, then an validation to handle the change with respect to existing access management policies may be performed, as indicated at 750. For example, the service change may be compared with existing access management policies to see if the change is covered by an action or other aspect of a policy statement. It may be the case that a service change does not affect the validity or scope of the policy. As in the example above, a new action, for instance may still be a "read-only" action and therefore may not violate the policy. In scenarios where the service does affect the policy (e.g., in terms of extending or modifying the scope of the policy or causing the policy to fail), then as indicated at 760, indication(s) of the existing access management polic(ies) affected by the detected change may be provided. For example, the indication may be a notification or status change sent via a communication system (e.g., notification system) or posted/displayed via an interface (e.g., a policy warning or other symbol indicating that the policy is affected by a detected change to the service a may need to be re-validated by a user, such as via a policy editor).

For identity and access management systems that will perform validations for many different clients, with different resources, services, and/or policies, opportunities exist to improve the performance of policy validation based on the feedback received for identified errors and suggested corrections produced by policy validations, such as using the various techniques discussed above with regard to FIG. 5. Machine learning techniques, for instance, can be used to determine suggested corrections that differ from or are not identified at all by rules-based error correction suggestions. For example, if a policy validator identifies an action in an access management policy that does not exist (e.g., is not supported by a service that hosts a targeted resource) and users frequently replace that invalid action with a different valid action, then a machine learning model could be trained to suggest the different valid action as a replacement for the invalid action. In another example, groups of actions that could occur together such that a missing action could be suggested (e.g., in scenarios where 4 actions are commonly performed and an access management policy only specifies 3 of the 4 actions, the missing fourth action could be suggested).

Figure 8:
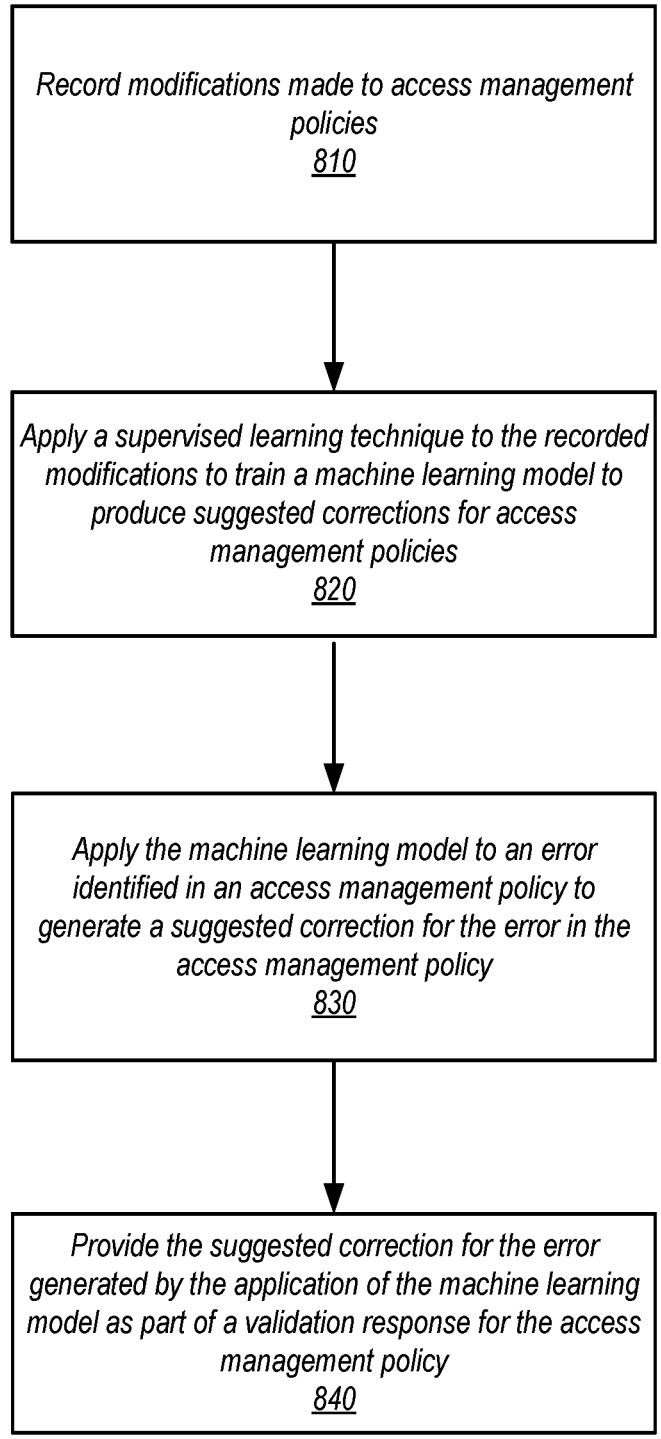
FIG. 8 is a high-level flowchart illustrating various methods and techniques to implement training and apply a machine learning model to suggest corrections to an access management policy undergoing validation, according to some embodiments.

FIG. 8 is a high-level flowchart illustrating various methods and techniques to implement training and apply a machine learning model to suggest corrections to an access management policy undergoing validation, according to some embodiments. As indicated at 810, modifications made to access management policies may be recorded, in some embodiments. For example, a data collection system implemented as part of a machine learning system or other component of an identity and access management system (or external system) can pair modifications to portions of policies along with other features like suggested corrections, error indications, or other information about the policy or prior response generated by a policy validator. These modifications may be treated as truth labels, in some embodiments.

As indicated at 820, a supervised learning technique may be applied to the recorded modifications to train a machine learning (ML) model to produce suggested corrections for access management policies, in some embodiments. For example, the truth labels indicated by the recorded modifications to portions of a policy may be used to train the machine learning model to solve a classification problem (e.g., class of suggestion) according to various supervised learning techniques, such as Factorization Machines Algorithm, K-Nearest Neighbors (k-NN) Algorithm, Linear learner algorithm, and/or XGBoost Algorithm, among others. In some embodiments, unsupervised techniques may be implemented (e.g., k-means algorithm) to generate the machine learning model.

The machine learning model may then be deployed or otherwise incorporated as part of policy validations that are performed, including policy validations with respect to resource state. As indicated at 830, the machine learning model may be applied to an error identified in an access management policy to generate a suggested correction for the error in the access management policy, in some embodiments. For example, portions of the policy may be converted into input features or parameters that can be analyzed or processed by the machine learning model (e.g., by converting portions of a symbol tree or other parsed portion (or the entirety of) the access management policy into a feature vector. In such an example, a correction classification inference may be determined. In some embodiments, a confidence value may be returned along with the suggested correction, in some embodiments, which may be used to filter out or not provide suggestions below a confidence threshold.

As indicated at 840, the suggested correction for the error generated by the application of the machine learning model may be provided as part of a validation response for the access management policy, in some embodiments. For instance, the suggested error may be provided in a text and/or API response, similar to the features discussed above with regard to FIG. 3. In some embodiments, the suggestion may be provided in a graphical user interface, similar to that discussed above with regard to FIG. 4.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
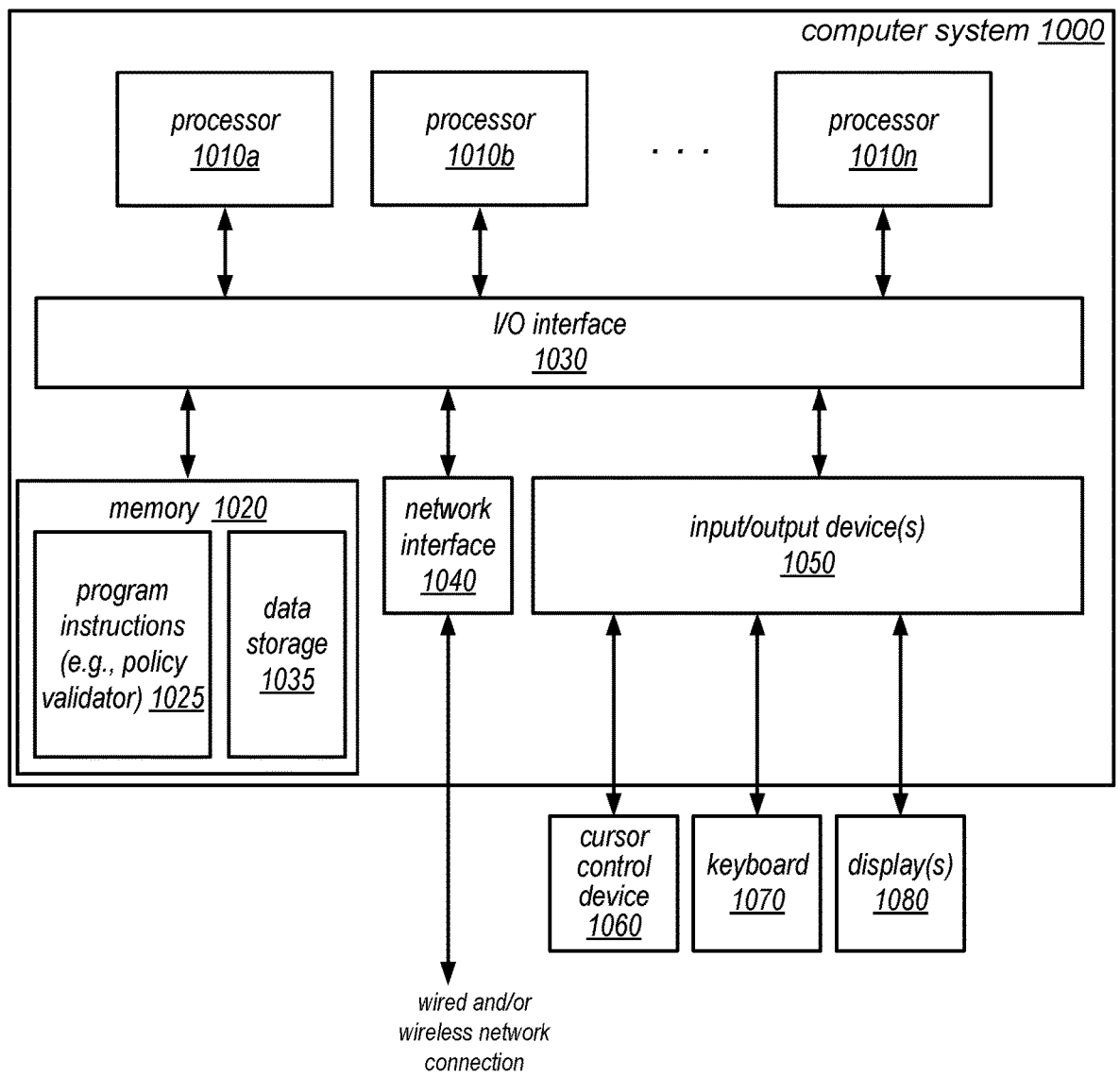
FIG. 9 illustrates an example system configured to implement the various methods, techniques, and systems described herein, according to some embodiments.

Embodiments of resource state validation of access control policies as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., policy validators and/or other features of identity and access control systems, services or other systems that implement resource state validation of access control policies) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein, such as a policy validator or other policy validation techniques, and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, nodes within a data lineage system may present data lineage services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
a memory, that stores program instructions that, when executed by the at least one processor, cause the one or more processors to implement an identity and access management system, configured to:
monitor for changes to one or more resources of a network-based service hosted by a provider network;
based on the monitoring, detect a first change at a first resource of the one or more resources;
determine that an access management policy is affected by the detected first change, wherein the first resource is associated with an account of the provider network, wherein the access management policy describes one or more actions that are respectively allowed or denied by the provider network; and
provide, via an interface of the identity and access management system, an indication that the access management policy is affected by the detected first change.

2. The system of claim 1, wherein the indication provides a suggested correction to the access management policy.

3. The system of claim 2, wherein the suggested correction to the access management policy is determined using a machine learning model trained to provide a suggested correction using prior policy modifications received for other access management policies at the identity and access management service.

4. The system of claim 2, wherein the identity and access management system is further configured to:
receive, via the interface of the identity and access management service, a request to perform the suggested correction to the access management policy; and
apply the suggested correction to the access management policy responsive to the request.

5. The system of claim 1, wherein the identity and access management system is further configured to:
based on the monitoring, detect a second change at a second resource of the one or more resources; and
determine that a second access management policy is not affected by the detected second change.

6. The system of claim 1, wherein the identity and access management system is further configured to automatically perform a correction to the access management policy.

7. The system of claim 1, wherein the indication provides a recommendation to validate the access management policy using a policy validator implemented as part of the identity and access management system.

8. A method, comprising:
monitoring, by an identity and access management system, for changes to one or more resources of a network-based service hosted by a provider network;
based on the monitoring, detecting, by the identity access and management system, a first change at a first resource of the one or more resources;
determining, by the identity and access management system, that an access management policy is affected by the detected first change, wherein the first resource is associated with an account of the provider network, wherein the access management policy describes one or more actions that are respectively allowed or denied by the provider network; and
providing, via an interface of the identity and access management system, an indication that the access management policy is affected by the detected first change.

9. The method of claim 8, wherein the indication provides a suggested correction to the access management policy.

10. The method of claim 9, wherein the suggested correction to the access management policy is determined using a machine learning model trained to provide a suggested correction using prior policy modifications received for other access management policies at the identity and access management service.

11. The method of claim 9, further comprising:
receiving, via the interface of the identity and access management service, a request to perform the suggested correction to the access management policy; and
applying, by the identity and access management system, the suggested correction to the access management policy responsive to the request.

12. The method of claim 8, further comprising:
based on the monitoring, detecting, by the identity access and management system, a second change at a second resource of the one or more resources; and
determining, by the identity and access management system, that a second access management policy is not affected by the detected second change.

13. The method of claim 8, further comprising automatically performing a correction to the access management policy.

14. The method of claim 8, wherein the indication provides a recommendation to validate the access management policy using a policy validator implemented as part of the identity and access management system.

15. One or more non-transitory computer-readable storage media storing program instructions that, when executed on or across one or more computing devices, cause the one or more computing devices to implement:
monitoring, by an identity and access management system, for changes to one or more resources of a network-based service hosted by a provider network;
based on the monitoring, detecting, by the identity access and management system, a first change at a first resource of the one or more resources;
determining, by the identity and access management system, that an access management policy is affected by the detected first change, wherein the first resource is associated with an account of the provider network, wherein the access management policy describes one or more actions that are respectively allowed or denied by the provider network; and
providing, via an interface of the identity and access management system, an indication that the access management policy is affected by the detected first change.

16. The one or more non-transitory computer-readable storage media of claim 15, wherein the indication provides a suggested correction to the access management policy.

17. The one or more non-transitory computer-readable storage media of claim 16, wherein the suggested correction to the access management policy is determined using a machine learning model trained to provide a suggested correction using prior policy modifications received for other access management policies at the identity and access management service.

18. The one or more non-transitory computer-readable storage media of claim 16, storing further instructions that when executed on or across the one or more computing devices, cause the one or more computing devices to implement:
receiving, via the interface of the identity and access management service, a request to perform the suggested correction to the access management policy; and
applying, by the identity and access management system, the suggested correction to the access management policy responsive to the request.

19. The one or more non-transitory computer-readable storage media of claim 15, storing further instructions that when executed on or across the one or more computing devices, cause the one or more computing devices to implement:
based on the monitoring, detecting, by the identity access and management system, a second change at a second resource of the one or more resources; and
determining, by the identity and access management system, that a second access management policy is not affected by the detected second change.

20. The one or more non-transitory computer-readable storage media of claim 15, storing further instructions that when executed on or across the one or more computing devices, cause the one or more computing devices to implement automatically performing a correction to the access management policy.

* * * * *